United States Patent
Srinivasan et al.

(10) Patent No.: US 7,054,054 B1
(45) Date of Patent: May 30, 2006

(54) OPTICAL MODULATOR WITH A TRAVELING SURFACE RELIEF PATTERN

(75) Inventors: Uma Srinivasan, Mountain View, CA (US); Eric J. Shrader, Belmont, CA (US); Robert Matusiak, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 11/017,402

(22) Filed: Dec. 20, 2004

(51) Int. Cl.
*G02B 26/00* (2006.01)

(52) U.S. Cl. ..................................................... 359/295
(58) Field of Classification Search ................ 359/295, 359/290, 291, 297, 315, 846, 230, 231, 298
See application file for complete search history.

(56) References Cited

U.S. PATENT DOCUMENTS

| | | | |
|---|---|---|---|
| 3,942,048 A | 3/1976 | Laude et al. |
| 4,115,747 A | 9/1978 | Sato et al. |
| 4,327,966 A | 5/1982 | Bloom |
| 4,494,826 A | 1/1985 | Smith |
| 4,529,620 A | 7/1985 | Glenn |
| 4,626,920 A | 12/1986 | Glenn |
| 5,124,834 A | 6/1992 | Cusano et al. |
| 5,459,610 A | 10/1995 | Bloom et al. |
| 5,526,172 A | 6/1996 | Kanack |
| 5,661,592 A | 8/1997 | Bornstein et al. |
| 5,677,783 A | 10/1997 | Bloom et al. |
| 5,699,468 A | 12/1997 | Farries et al. |
| 5,841,579 A | 11/1998 | Bloom et al. |
| 5,867,301 A | 2/1999 | Engle |
| 5,999,319 A | 12/1999 | Castracane |
| 6,307,663 B1 | 10/2001 | Kowarz |
| 6,363,202 B1 | 3/2002 | Goodfellow |
| 6,389,190 B1 | 5/2002 | Solgaard et al. |
| 6,421,179 B1 | 7/2002 | Gutin et al. |
| 6,556,727 B1 | 4/2003 | Minakata et al. |
| 6,930,817 B1* | 8/2005 | Srinivasan et al. ......... 359/295 |
| 2003/0025563 A1 | 2/2003 | Christensen |

(Continued)

FOREIGN PATENT DOCUMENTS

EP 0 434 139 A2 6/1991

(Continued)

OTHER PUBLICATIONS

Sakarya, S., et al., *Technology of Reflective Membranes for Spatial Light Modulators; Sensors and Actuators A 97-98* (2002, pp. 468-472) 2002 Elsevier Science B.V.

(Continued)

*Primary Examiner*—Hung Xuan Dang
*Assistant Examiner*—Tuyen Tra
(74) *Attorney, Agent, or Firm*—Fay, Sharpe, Fagan, Minnich & McKee, LLP (57) ABSTRACT

A variable modulator assembly includes a deformable layer adhered to a compliant layer surface, and an n-phase electrode configuration, n>2, adhered to an opposite surface of the compliant layer. A controller is configured to selectively apply a variable signal to the selected electrodes of the electrode configuration. Application of the variable signal causes the deformable layer to reconfigure to an alternated shape having distinct peaks and valleys. The distance between the peaks and valleys being determined by the value of the applied variable signal, wherein the alternated shape travels in a preferred direction. An optical modulating method includes positioning the variable modulator assembly to receive and reflect light from a light source, monitoring the reflected light, and altering the variable signal to maintain a desired output intensity.

22 Claims, 10 Drawing Sheets

U.S. PATENT DOCUMENTS

2004/0212869 A1    10/2004    Srinivasan et al.

FOREIGN PATENT DOCUMENTS

EP          0 434 139 A3      6/1991
WO      WO 02/091024 A2    11/2002

OTHER PUBLICATIONS

Sakarya, S., et al., *Low-Cost Technological Approaches to Micromachined Spatial Light Modulators,* Proceedings of SPIE vol. 4825 (2002), pp. 264-271; 2002 SPIE—0277-786X/02.

Sakarya, S., et al., *Technology for Integrated Spatial Light Modulators Based on Reflective Membranes,* Proceedings of SPIE vol. 4493 (2002), pp. 21-28; 2002 SPIE—0277-786X/02.

Sakarya, S., et al., *Technology for Integrated Spatial Light Modulators Based on Viscoelastic Layers,* Laboratory of Electronic Instrumentation, Delft University of Technology, pp. 672-675.

Brown, et al., "Micromachined, Electrostatically-Actuated Optical Attenuators/Switches Fabricated by Fusion Bonding of Single-Crystal, Ultra-Thin Silicon Wafers", *ESC Proceedings,* vol. 99-35, to be published.

"Lightconnect Introduces First MEMS-Based Digital Variable Optical Attenuator Optimized for Open-Loop Control", Dec. 5, 2001, Newark, Calif., Press Releases, http://www.lightconnect.com/neews/news_release120501b.shtml.

Kück, et al., "Deformable Micromirror Devices as Phase-Modulating High-Resolution Light Valves", *Sensors and Actuators A54,* (1996) pp. 536-541.

Sakarya, S., et al., *Technology of Reflective Micromachined Pixelated Membranes for Use in Spatial Light Modulators;* Proceedings of the SeSens workshop, pp. 690-691, Dec. 1, 2000; ISBN: 90-74561-24-3; STW-2000 09 26-02:112.

Vdovin, G., et al., Technology and Applications of Micromachined *Membrane Deformable Mirrors;* 0-7803-4953-9/98 0-7803-4953-9/98, 1998 IEEE, 2 pages.

Srinivasan, Uma, et al., *Electrostrictive Elastomer Based Diffractive Modulator for Use as a Variable Optical Attenuator,* Device Hardware Laboratory, Palo Alto Research Center Incorporated, 2 pages.

Sheridon, N.K., "The Ruticon Family of Erasable Image Recording Devices," *IEEE Transactions on Electron Devices,* ED-19, No. 9, Sep. 1972, pp. 1003-1010.

Sheridon, N.K., et al., "The Optical Processing Capabilities of the Ruticon," SPIE vol. 128, *Effective Utilization of Optics in Radar Systems* (1977), pp. 244-252.

Brinker, W. et al., *Deformation Behavior of Thin Viscoelastic Layers Used in an Active-Matrix-Addressed Spatial Light Modulator;* Proceedings of the SPIE; SPIE, Bellingham, Va., U.S.; vol. 1018, Sep. 22, 1988, pp. 79-85; XP002042949, ISSN: 0277-786X; *pp. 79-pp. 80; Figures 1, 5, 9*.

* cited by examiner

OPTICAL MODULATOR WITH A TRAVELING SURFACE RELIEF PATTERN

CROSS REFERENCE

The following application is related to the present disclosure: U.S. Ser. No. 10/423,752, Uma Srinivasan, Eric J. Shrader, entitled CONFIGURABLE GRATING BASED ON SURFACE RELIEF PATTERN FOR USE AS A VARIABLE OPTICAL ATTENUATOR, fully incorporated herein by reference.

BACKGROUND

The present exemplary embodiment relates to optical grating assemblies. It finds particular application in conjunction with an assembly and method for an elastomer-based grating assembly based on a travelling surface relief pattern for use as a variable optical attenuator, and will be described with particular reference thereto. However, it is to be appreciated that the present exemplary embodiment is also amenable to other like applications.

Fiber networks normally employ point-to-point links, which are static, where most of the intelligence, provisioning and grooming functions are provided by electronics at the ends of each link. As network architectures grow in size and complexity, however, this approach to building and maintaining network infrastructure will not satisfy the requirements of reliability, efficiency and cost-effectiveness required by service providers. Therefore, the industry is moving to optically reconfigurable networks where optical paths, wavelengths and data rates are dynamically changed to satisfy network system requirements, such as provisioning new wavelengths, balancing data loads and restoring after-service malfunctions.

Variable optical attenuators (VOA) are used to permit dynamic control of optical power levels throughout a communications, telecommunications or other transmission network. As traffic in networks increase, VOAs may be used to dynamically lower the optical power levels depending on the length of the network route so that appropriate power levels are received at the end receivers. As an example of their usefulness, if a network is providing a wavelength route that is approximately 60 km in length, at a predetermined power, and the network attempts to change the wavelength route to one which is 30 km, it would be expected that excessive power would be delivered to the end receivers of the 30 km route, potentially resulting in a malfunction in the network. A VOA will lower the power output of the switched wavelength to permit a signal of acceptable strength at the end receiver. The VOAs may be maintained at a particular power level for long durations, e.g., several months or even several years. Drift of the output power of the VOA can become an issue under such circumstances.

Existing VOAs commonly implement mechanical systems to attenuate the light. In one design, attenuation is accomplished by moving two separate optical fibers, and in another by inserting a motor-driven blade or filter in the light path. While these devices have acceptable optical performance, tradeoffs include slow speed, undesirable noise and a potential for mechanical failure.

Work on a traveling wave concept has primarily been focused in the area of surface acoustic waves, piezoelectrics, and electro-optic modulators where refractive index is changed by the application of electric fields.

In one particular example, U.S. Pat. No. 6,556,727 to Minakata et al. in its Abstract describes the concept of a traveling wave-type optical modulator having a substrate made of an electro-optic material, optical waveguides fabricated on the top surface of the substrate, and electrodes for modulating an optical wave through the optical waveguide. The substrate is partially thinned from the bottom surface of the substrate to form a first thin portion and a second thin portion so the thickness of the first thin portion is set to be larger than the thickness of the second thin portion, and the optical waveguide is positioned in the first thin portion. Among other concepts, this application does not discuss the use of a traveling wave used to create phase gratings that have corrugations with nearly constant pitch and depth.

The foregoing material does not address the noted shortcomings of existing systems.

BRIEF DESCRIPTION

In accordance with one aspect of the present exemplary embodiment, there is provided a variable modulator assembly comprising a compliant layer having a first and a second surface. A deformable layer is adhered to the first surface of the compliant layer, and an electrode configuration consisting of a plurality of electrodes is in contact with the second surface of the compliant layer. The electrode configuration is configured for n-phase operation, with n>2. A controller is configured to selectively apply a variable signal to selected electrodes of the electrode configuration, wherein application of the variable signal causes the deformable layer to reconfigure to an altered shape having distinct peaks and valleys, the distance between the peaks and valleys being determined by the value of the applied variable signal, and wherein the altered shape moves in a preferred direction in the plane of the deformable layer.

In accordance with another aspect of the present exemplary embodiment, there is provided an optical modulating method. The method comprises positioning a variable modulator assembly to receive light from a light source, wherein a deformable layer is adhered to a first surface of a compliant layer of the light source, and deformation of the deformable layer is controlled by selective activation of an electrode configuration adhered to a second surface of the compliant layer. The activation of the electrode configuration is controlled by a controller which generates a variable signal and transmits the variable signal to selected electrodes of the electrode configuration. Activation of the electrodes creates electrostatic charges which deform the deformable layer into a travelling pattern moving in a direction parallel to the plane of the deformable layer corresponding to the activated electrodes.

In accordance with yet another aspect of the present exemplary embodiment, there is provided a VOA device fabrication method. The method comprises depositing a bus metal layer on a substrate, patterning the bus metal layer, depositing a dielectric layer on the bus metal layer and the substrate, forming a via in the dielectric layer to the bus metal layer, depositing a bottom electrode metal layer in contact with the bus metal layer, the bottom electrode layer being configured for n-phase operation, wherein n>2, spin coating a compliant layer onto the bottom electrode layer and the dielectric layer, and depositing a blanket top electrode/reflector metal layer onto the compliant layer.

DETAILED DESCRIPTION

Figure 1A:
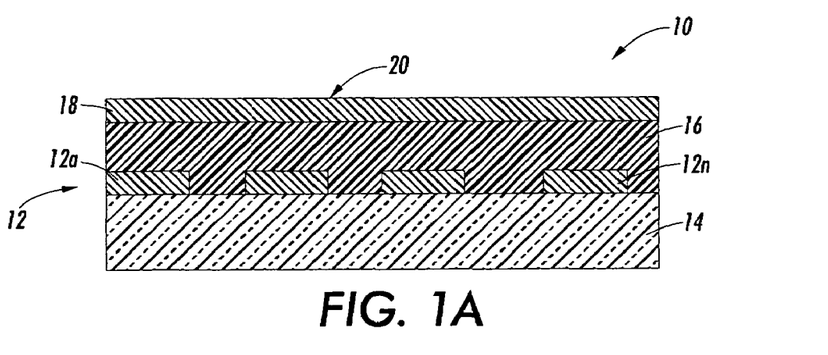
FIG. 1A is cross-sectional view of a variable optical modulator system according to concepts of the present application.
Figure 1B:
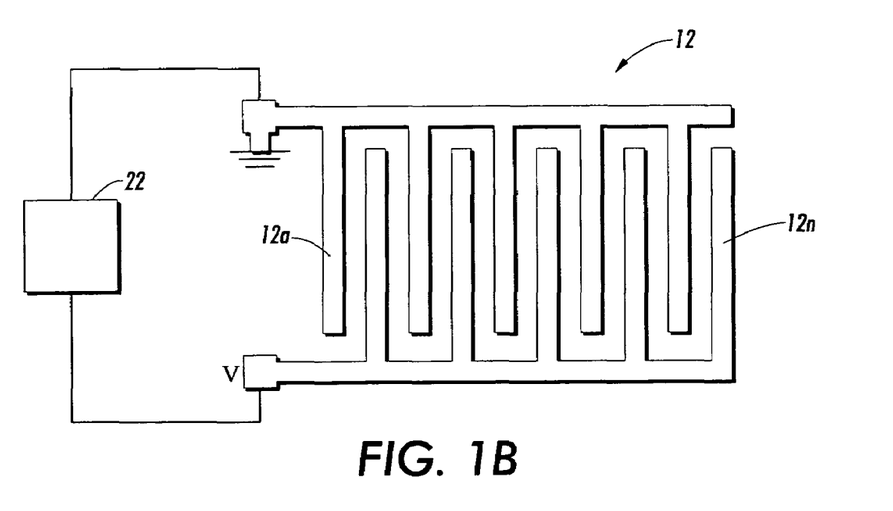
FIG. 1B is top schematic view of an electrode configuration of the system of FIG. 1A.

With reference to FIG. 1A, an elastomer-based VOA device 10, which may be a variable optical attenuator according to concepts of the present application, is illustrated in simplified schematic form. The VOA device 10 is constructed with a bottom electrode configuration 12, comprising electrodes 12a–12n, on a glass substrate 14, a compliant layer 16 and a deformable top electrode 18 as shown in the figure. In one embodiment, the bottom electrode configuration 12 is patterned using known photolithography techniques in order to achieve a desired surface relief pattern on the upper surface 20 of the top electrode 18, the surface relief pattern corresponding to the system's grating structure. In this exemplary embodiment, the electrode configuration is an interdigitated pattern as illustrated in FIG. 1B. The compliant layer 16 may be a dielectric, elastomer or electrostrictive material, such as Poly-di-methyl-siloxane (PDMS) formed by known spin-coating or other manufacturing techniques. Piezo-electric materials like poly vinylidene fluoride may also be considered, provided that the frequency of operation is carefully chosen. Top electrode 18 may be an individual or pixel electrode, the electrode may be constructed using at least one of a TFT or CMOS design.

The upper surface 20 of the deformable top electrode 18 is made to be a reflective surface, which may be a polished surface of the deformable compliant layer 16, or may be a separate blanket or patterned layer made of reflective material including but not limited to a variety of metals. In one embodiment, the deformable top electrode 18 is directly attached onto an upper surface of the compliant layer 16. In other embodiments an interposed protective layer (not shown) is provided. The deformable top electrode 18 is conductive as well as reflective. In the configuration shown, the top deformable electrode 18 is made to be conductive and reflective by depositing a thin film of silver.

Figure 2A:
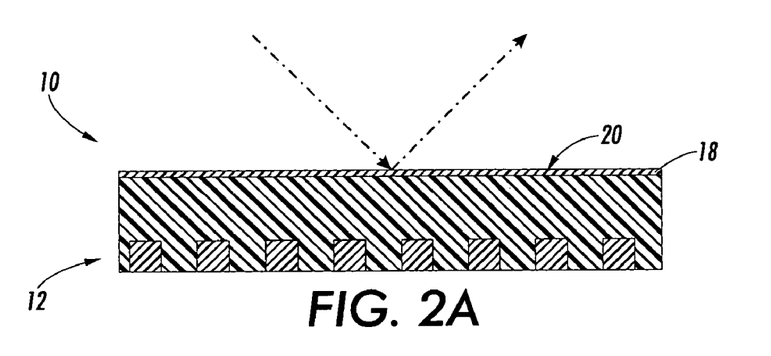
FIG. 2A is cross-sectional view of an exemplary variable optical modulator system prior to application of a signal voltage.
Figure 2B:
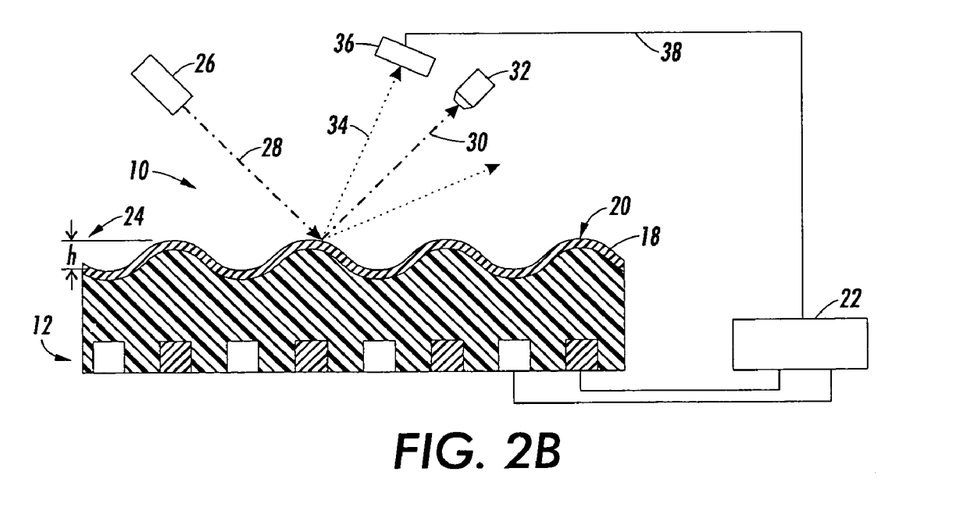
FIG. 2B is cross-sectional view of the variable optical modulator system of FIG. 2A showing corrugations after application of a signal voltage.

The VOA device 10 shown in FIGS. 1A–1B comprises a configurable reflection phase grating that generates a nearly sinusoidal surface relief pattern by the application of voltage by the controller 22 to the bottom electrode configuration 12. The reflective upper surface 20, of the deformable layer 18, is designed to be reflective and act as a mirror as shown in FIG. 2A when no voltage is applied to the electrode configuration. In this embodiment, the deformable layer 18 is grounded, and the electrode configuration 12 is supplied with a bias and/or variable voltage from a voltage signal generator/controller 22 in order to produce the desired grating structure of the system. As the applied voltage is increased, the compliant layer 16 experiences an electrostrictive force. The compressive stress p experienced by the compliant layer is given by $$p = \epsilon_0 \epsilon_r E^2$$

where, E is the electric field generated by the applied voltage, and $\epsilon_0$, $\epsilon_r$ are the permittivity of free space and the relative dielectric constant, respectively. The electric field corrugates the upper surface 20 according to the bottom electrode geometry as shown in FIG. 2B.

The corrugation of the upper surface 20 causes the VOA device to behave like a diffraction grating and higher orders of diffracted light are observed as described by $$d(\sin\theta_i + \sin\theta_m) = m\lambda$$

where, d is the grating constant, $\theta_i$ is the incident angle, $\theta_m$ is the diffracted angle, m is the diffraction order and $\lambda$ is the wavelength of the diffracted light. The intensity of light diffracted into the various orders depends on the corrugation depth.

Interference between light reflected from the top and bottom of the corrugation in the phase grating of the upper layer 20 causes the varying intensity and may be expressed as $$I_n = A J_n^2 [\Delta m]$$

where $I_n$ is the intensity of light in the $n^{th}$ order beam, A is a proportionality constant that depends on the signal intensity, $J_n$ is a Bessel function of order n, $\Delta m$ is the phase difference, which depends on the corrugation depth h (24) and is given by $\Delta m = 4\pi h/\lambda$.

To illustrate further, when no variable voltage is supplied from the controller 22, the reflective surface 20 acts as a mirror, and displacement of an impinging light beam is at substantially zero displacement. As the voltage to the electrode configuration 12 is increased by the controller 22, displacement, or diffraction, of the light is increased. When the surface relief pattern is displaced by a quarter wavelength, i.e., h=λ/4, the light reflected from the uppermost part of the reflective surface 20 is 180 degrees out of phase with the light reflected from the lowermost part of the reflective surface, and destructive interference occurs. At this point, the light is totally diffracted, and essentially none is reflected.

Analog control of the reflected light may be achieved by monitoring at least one of the diffracted order wavelengths such as the $1^{st}$ order diffracted wavelength. For example, initially, the $0^{th}$ order and $1^{st}$ order diffraction intensity as a function of voltage is calibrated and this information used to control the intensity of the $0^{th}$ order by monitoring the $1^{st}$ order diffraction. In one implementation, as shown in FIG. 2B, a light source 26 emits a light beam 28. A reflected light portion 30 is transmitted to an element 32, such as a fiber, receiver, or other mechanism. A diffracted light wave 34, is sensed by a sensor 36. The sensor 36 may be substantially transparent to the wavelength of the diffracted light 34 for situations where additional testing or use of the diffracted light wave 34 is to be undertaken. Output from the sensor 36 is provided via a feedback line 38 to the controller 22. Feedback circuitry included in the controller 22 uses the signal obtained from the $1^{st}$ order diffracted wavelength to control the voltage applied to the electrode configuration 12.

This design permits for a non-destructive monitoring and controlling of the $0^{th}$ order. Hence, in this example the deformation of the deformable layer 18, with the reflective surface 20, is controlled from the $0^{th}$ order to the $1^{st}$ order by an analog control mechanism. By use of this analog control, the intensity output value for the $0^{th}$ order is closely controllable. For example, when no variable voltage is applied (so the surface is essentially a mirror) the intensity output of a beam of light to the component 32 may be substantially 100 percent of the light beam 28. If the desired output requirements change wherein, e.g., only 75 percent intensity in the $0^{th}$ order is needed, the amount of voltage supplied to the electrode configuration 12 is undertaken to increase the deformation such that 25 percent of the intensity goes into higher order diffracted wavelengths (e.g., 34). More generally, the present design permits analog control from a first displacement of the deformable layer 18 to a second displacement of the deformable layer.

Figure 3:
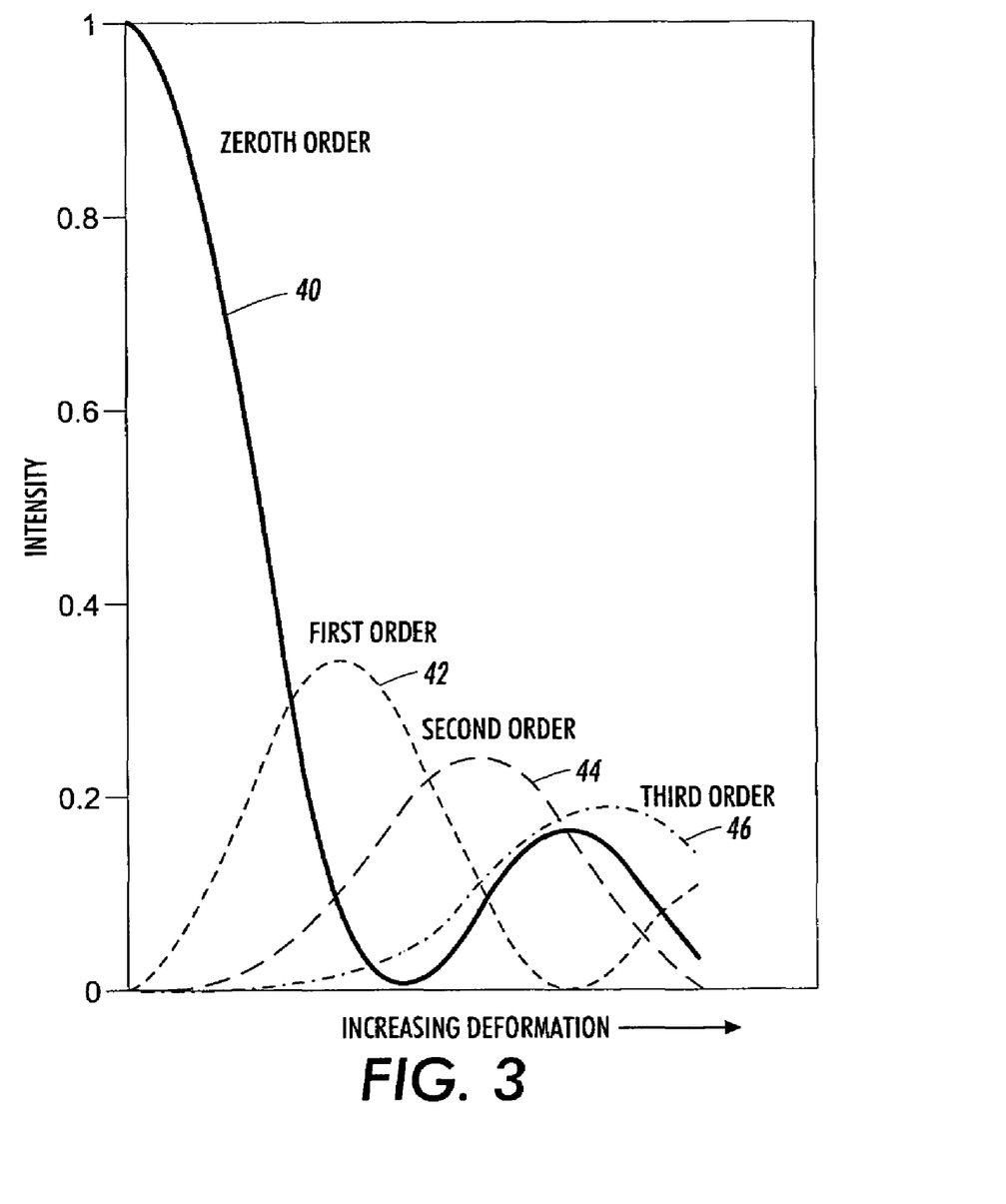
FIG. 3 is a plot of a theoretical diffraction intensity of an exemplary reflective sinusoidal phase grating for increasing deformation.

FIG. 3 shows the theoretical diffraction intensity of a reflective sinusoidal phase grating for increasing deformation, i.e., increasing corrugation depth. The $0^{th}$ order diffraction intensity $I_0$ (40) is maximum when Δm=0 and it is essentially zero when Δm=0.75π. In other words, when the reflective surface 20 relief pattern is displaced such that Δm=0.75π, the light reflected from the surface relief pattern of the corrugation is subject to essentially 100 percent destructive interference for the nominally reflecting beam. At this point, all of the reflected light is totally diffracted and essentially none is reflected. Hence in the range where the corrugation dimension h (24) is controlled, such that Δm is between 0 and 0.75π, an analog control of the light can be achieved. Also shown in the figure are the $1^{st}$ order (42), $2^{nd}$ order (44), and $3^{rd}$ order (46) diffraction intensities.

As mentioned above the VOA devices are usually maintained at any particular power level for long durations, which may be, e.g., several months or even several years. Long term drift of the output power of the VOA device can become an issue under such circumstances. For a configurable grating based VOA, generating a constant diffracted intensity means the device should produce a surface relief pattern where the corrugation pitch and depth does not change significantly with time. It has been found that cycling the voltage controls the drift more effectively than when the device works at a fixed DC bias. Therefore, an improvement is realized by providing a traveling wave to gratings that are intended to have corrugations with nearly constant pitch and depth of the peaks and valleys of the surface.

Figure 4A:
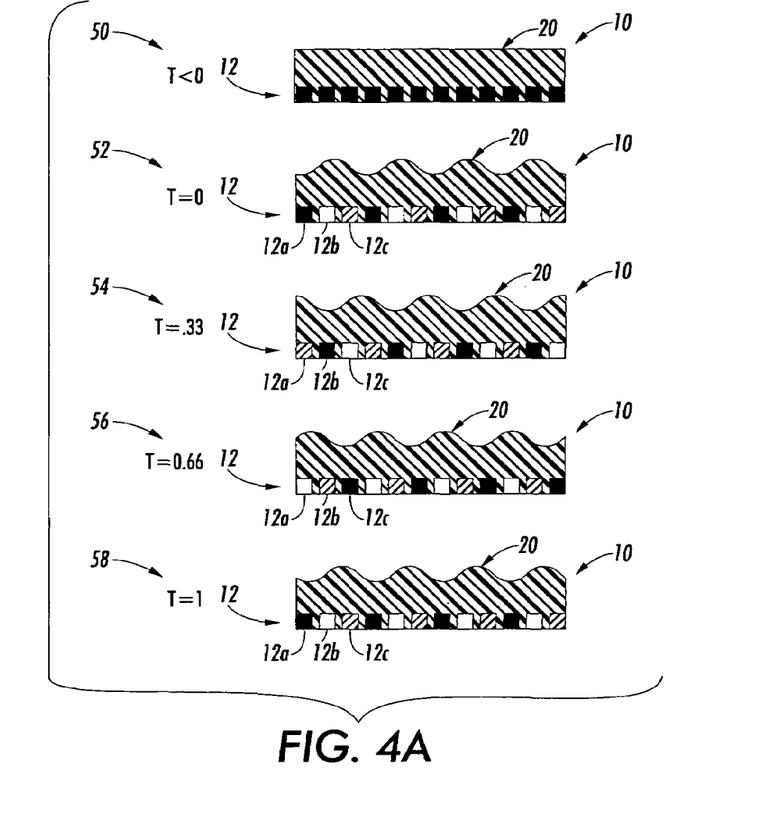
FIG. 4A is a cross-sectional representation of an exemplary 3-phase traveling wave over one voltage cycle on a 3-phase VOA.

To create the traveling wave, the electrode configuration 12 is swept with a variable signal (which in this embodiment is an analog signal) by the controller 22. To accomplish this, the controller 22 may have n-phase (n>2) drive electrodes, rather than the two illustrated in FIGS. 1B and 2B, and the electrode configuration 12 will have a corresponding number of sets of electrodes as described in more detail below. This creates a phase grating in which there is minimal undesired change in the corrugation depth, and the grating pattern is moving in space, i.e., moving across the reflective surface 20. For example, FIG. 4A shows a 3-phase traveling wave over one voltage cycle on a VOA device 10 having an electrode configuration 12 configured for a 3-phase input.

Figure 4B:
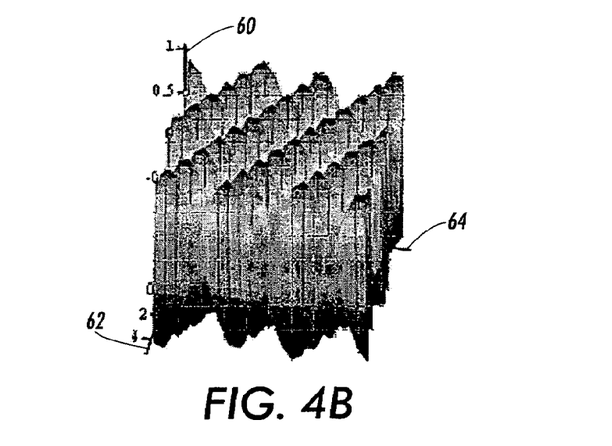
FIG. 4B is a 3-dimensional representation of the 3-phase traveling wave of FIG. 4A.

Prior to time t=0 (50), the VOA device 10 has a smooth reflecting surface 20 as shown. At time t=0 (52), an initial 3-phase voltage is applied to the interdigitated electrode configuration 12, as represented for visualization purposes, e.g., by the patterns shown on each of the electrodes 12a–12c. This initial voltage causes the reflecting surface 20 to have a corrugation corresponding approximately to a sine wave as shown. At times t=0.33 (54), t=0.66 (56), and t=1 (58), it may be observed that the 3-phase voltage pattern is moved across the electrode configuration 12 by the controller 22. Consequently, the corrugation of the reflecting surface 20 moves in phase with the 3-phase voltage across the reflecting surface. FIG. 4B shows a 3-dimensional plot of the applied 3-phase voltage (60) at the bottom electrode configuration 12 for the example shown in FIG. 4A, as a function of electrode position 62 and time 64, graphically illustrating the concept of the travelling wave.

Figure 5A:
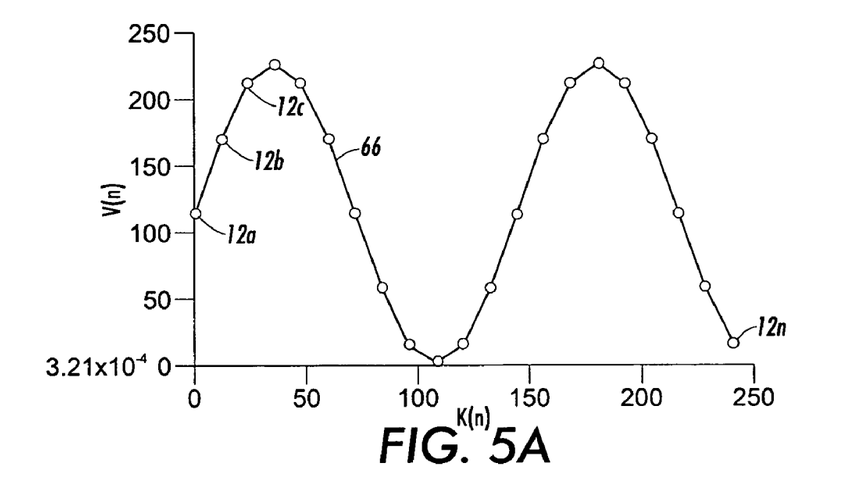
FIG. 5A is a plot showing a 12-phase voltage across an electrode configuration according to embodiments of the present application at a particular point in time.
Figure 5B:
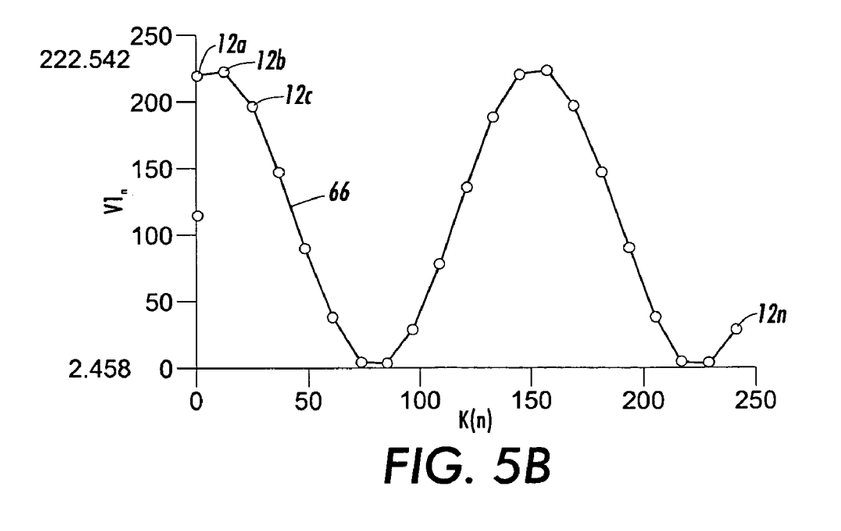
FIG. 5B is a plot showing the progression of the 12-phase voltage of FIG. 5A at a later point in time.

The phase difference between adjacent electrodes of the electrode configuration 12 depends on the specified tolerance of the output power. While a 12-phase voltage provides a grating waveform closer to an actual sinusoidal grating, it has the disadvantage of providing a lower diffraction angle and requires more complicated electronics. A 3-phase voltage, on the other hand, does not approximate an actual sinusoidal grating as well as the 12-phase voltage, but provides a larger diffraction angle and requires less complicated drive electronics than the 12-phase voltage. FIGS. 5A–5B show the progression of a 12-phase voltage across the electrode configuration 12 at two different times. At a first time shown in FIG. 5A, the applied voltage 66 at each of the electrodes 12a–12n is seen to closely approximate a sine wave voltage. The voltage potential between adjacent electrodes is approximated by a straight line, but because of the number of phases, the voltage curve 66 follows a general approximation of a sine wave. At a later time shown in FIG. 5B, the applied voltage waveform 66 has advanced across the electrodes 12a–12n, but still generally approximates a sine wave voltage.

Figure 6A:
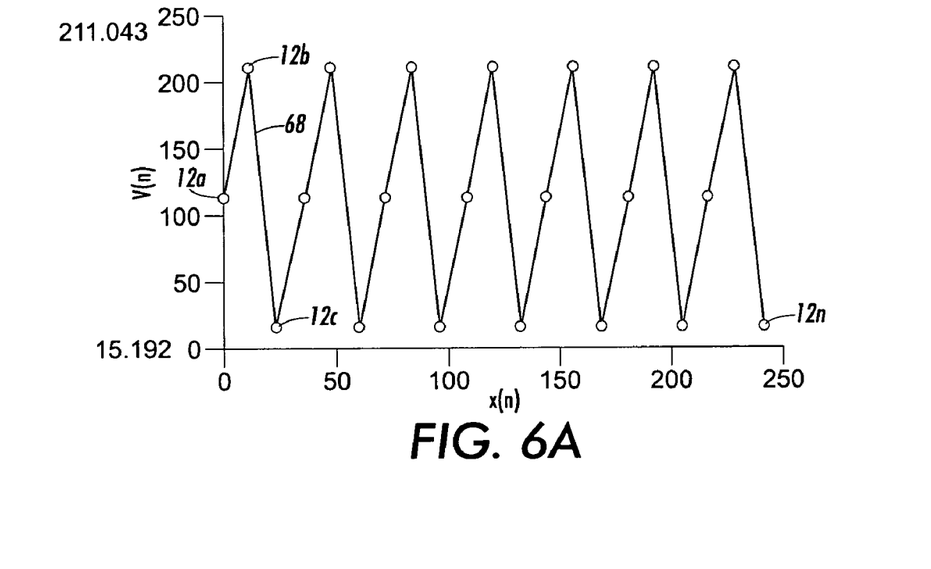
FIG. 6A is a plot showing a 3-phase voltage across an electrode configuration according to embodiments of the present application at a particular point in time.
Figure 6B:
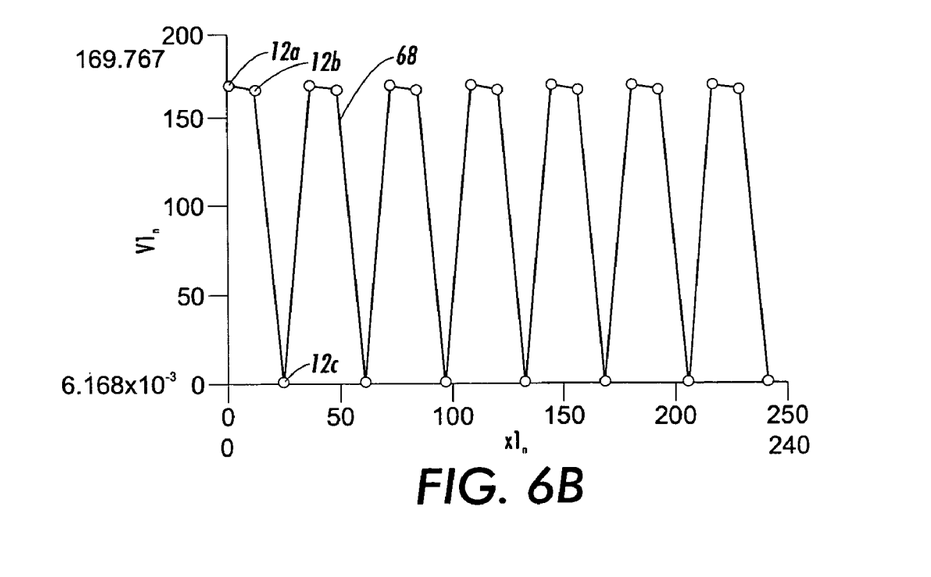
FIG. 6B is a plot showing the progression of the 3-phase voltage of FIG. 6A at a later point in time.

FIGS. 6A–6B similarly show the progression of a 3-phase voltage across the electrode configuration 12 at two different times. At a first time shown in FIG. 6A, the applied voltage 68 at each of the electrodes 12a–12n only loosely approximates a sine wave voltage. However, for many applications, depending on the necessary output tolerance, this approximation is adequate. The voltage potential between adjacent electrodes is again approximated by a straight line, but because of the fewer number of phases, the voltage curve 68 takes on the appearance of a saw-tooth wave at the time shown in the figure. At a later time shown in FIG. 6B, the applied voltage waveform 68 has advanced across the electrodes 12a–12n, and the shape has changed noticeably, but still loosely approximates a sine wave voltage.

The voltage at each electrode at position x for the examples shown in FIGS. 5A–6B may be calculated using the equation $$V = V_{offset} + \frac{V_{pp}}{2}\sin(\omega t + \phi_n)$$

with $V_{pp}$=peak-to-peak voltage (e.g. 225V), $V_{offset}=V_{pp}/2$, and $\phi_n$ being the phase difference between adjacent electrodes. It may be observed in FIGS. 5A–6B that the traveling wave goes through a maximum peak-to-peak voltage and minimum peak-to-peak voltage over time per cycle of the traveling wave. For example, by comparing FIG. 6A to FIG. 6B, it is observed that the peak-to-peak voltage is approximately 200 volts in FIG. 6A, whereas at a different time shown in FIG. 6B, the peak-to-peak voltage is approximately 170 volts. This short term variation in peak-to-peak voltage constitutes a jitter which has been simulated and has been shown to be higher for the 3-phase voltage than for the 12-phase voltage as can be seen in the respective figures.

Figure 7:
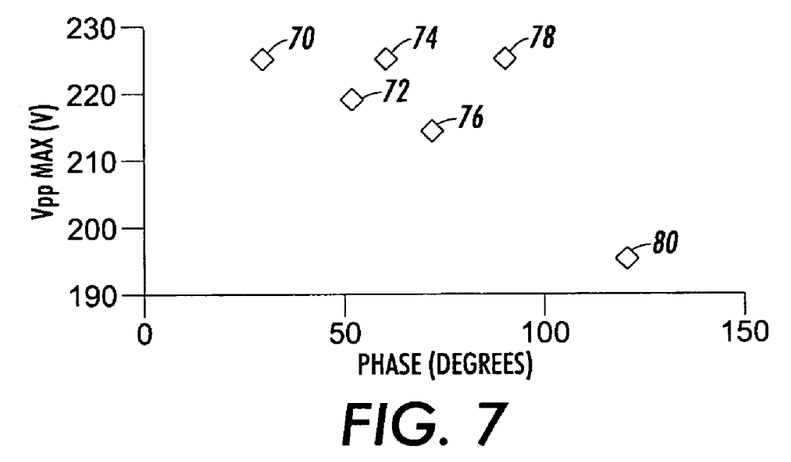
FIG. 7 is a plot showing the maximum peak-to-peak voltage experienced by individual electrodes in exemplary VOA devices according to embodiments of the present application as a function of the phase difference between the electrodes.

The maximum peak-to-peak voltage experienced by the individual electrodes in a VOA device, as a function of the phase difference between the electrodes, is shown in FIG. 7. The maximum peak-to-peak voltage is shown for exemplary embodiments of 12 phase (70), 7 phase (72), 6 phase (74), 5 phase (76), 4 phase (78), and 3 phase (80) circuits. It may also be observed for these particular embodiments that the even phases yield the highest peak-to-peak voltages, while the odd phases yield a peak-to-peak voltage that declines as the number of phases is reduced. The maximum peak-to-peak voltage determines the maximum depth of the corrugation that will be possible.

Figure 8:
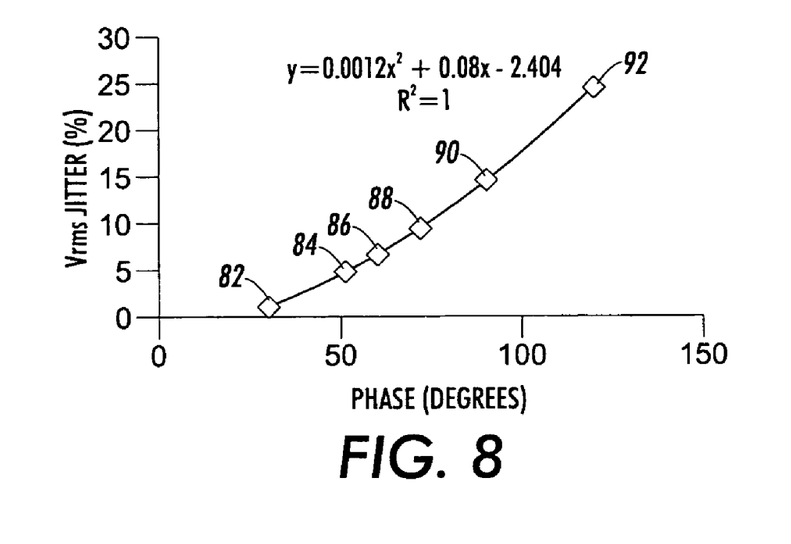
FIG. 8 is a plot showing the rms voltage jitter experienced by individual electrodes in exemplary VOA devices as a function of the phase difference between the electrodes.
Figure 9:
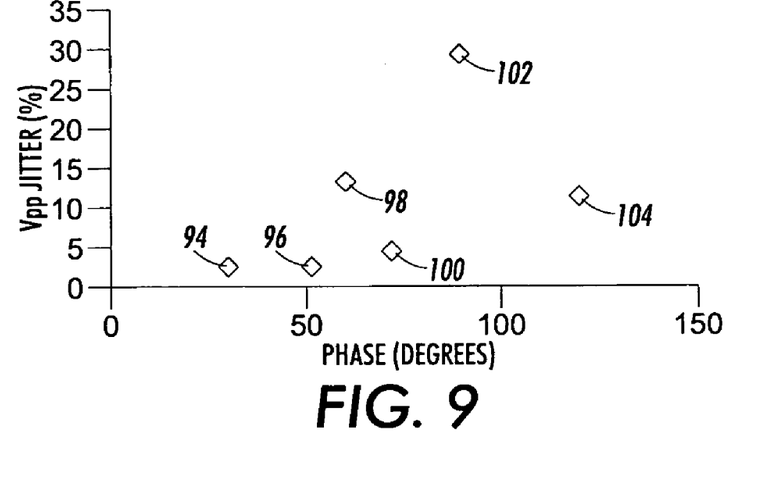
FIG. 9 is a plot showing the peak-to-peak voltage jitter experienced by individual electrodes in exemplary VOA devices as a function of the phase difference between the electrodes.
Figure 10:
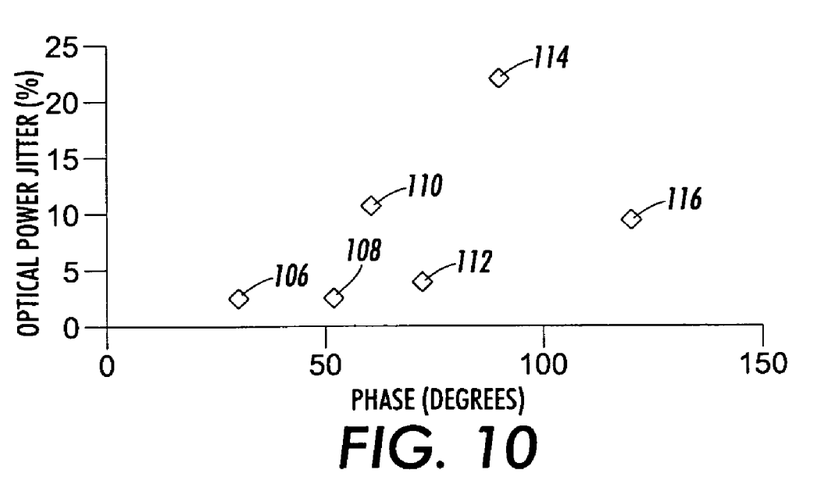
FIG. 10 is a plot showing an exemplary maximum jitter in the optical power as a function of the phase difference between the electrodes configured according to concepts of the present application.

The maximum jitter in the rms voltage as a function of the phase difference between the electrodes is shown in FIG. 8. The maximum rms jitter is shown, as in FIG. 7, for 12, 7, 6, 5, 4, and 3 phase circuits (82–92 respectively). Likewise, FIG. 9 shows the maximum jitter in the peak-to-peak voltage as a function of the phase difference between the electrodes for the same 12, 7, 6, 5, 4, and 3 phase circuits (94–104 respectively). Jitter in the maximum peak to peak voltages of the bottom electrodes 12 corresponds to jitter in the corrugation depth, which in turn corresponds to the diffraction optical power. The maximum jitter in the optical power as a function of the phase difference between the electrodes is shown in FIG. 10 (106–116). For the embodiments represented in the figure, the odd phases (108, 112, 116) generally have a lower optical power jitter compared to the even phases (106, 110, 114).

Figure 11:
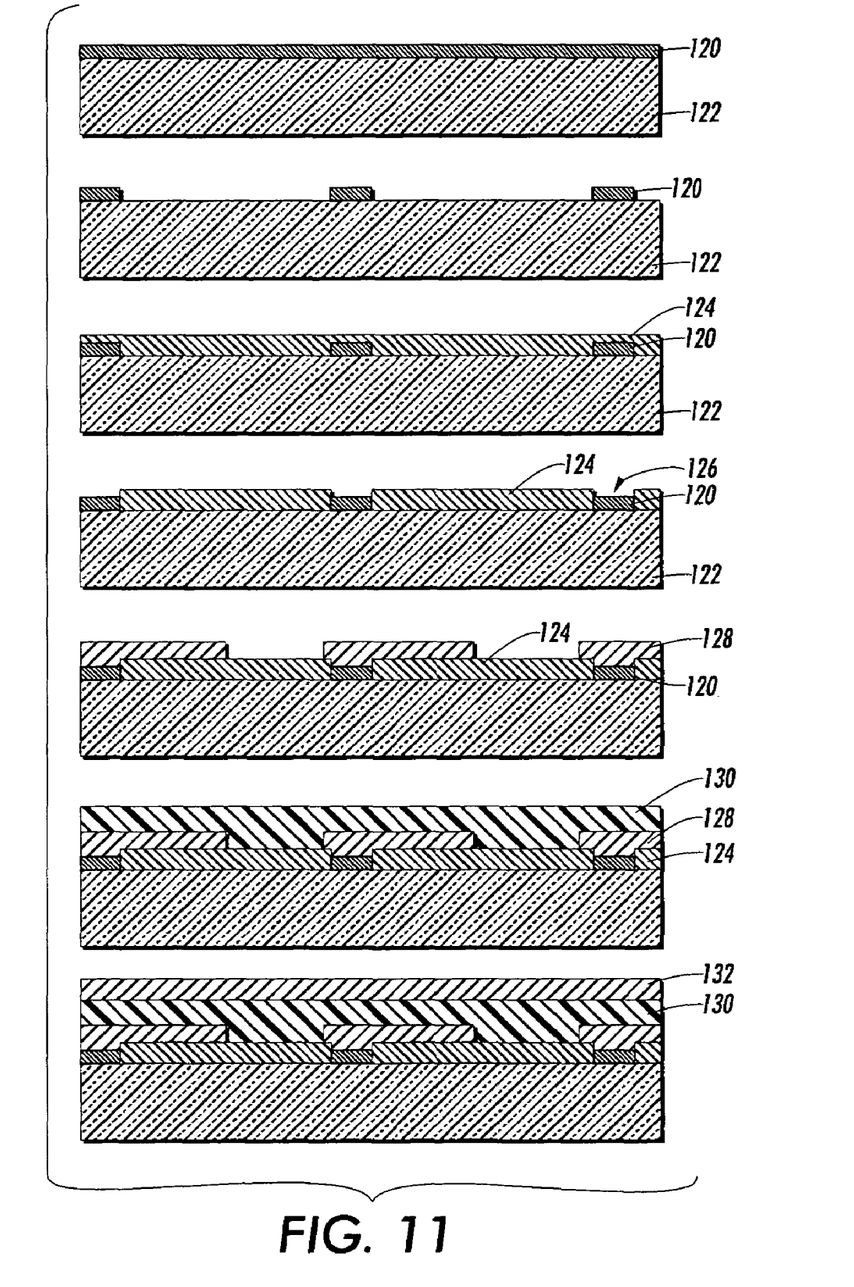
FIG. 11 is an exemplary device fabrication procedure for embodiments of the present application.

Attention is now directed toward an exemplary device structure and process flow for producing embodiments incorporating concepts of the present disclosure. With reference to FIG. 11, an exemplary device fabrication procedure includes the following steps:

A bus metal layer 120 is deposited on a substrate 122, and the bus metal layer 120 is then patterned.

A dielectric layer (e.g. oxide) (124) is deposited on the bus metal layer 120 and the substrate 122.

Next, a via 126 is made in the dielectric layer 124 to the bus metal layer 120, and a bottom electrode metal layer 128 is deposited in contact with the bus metal layer 120.

An elastomer layer 130 is then spin coated onto the bottom electrode layer 128 and the dielectric layer 124.

Finally, a blanket top electrode/reflector metal layer 132 is deposited onto the elastomer layer 130.

Figure 12:
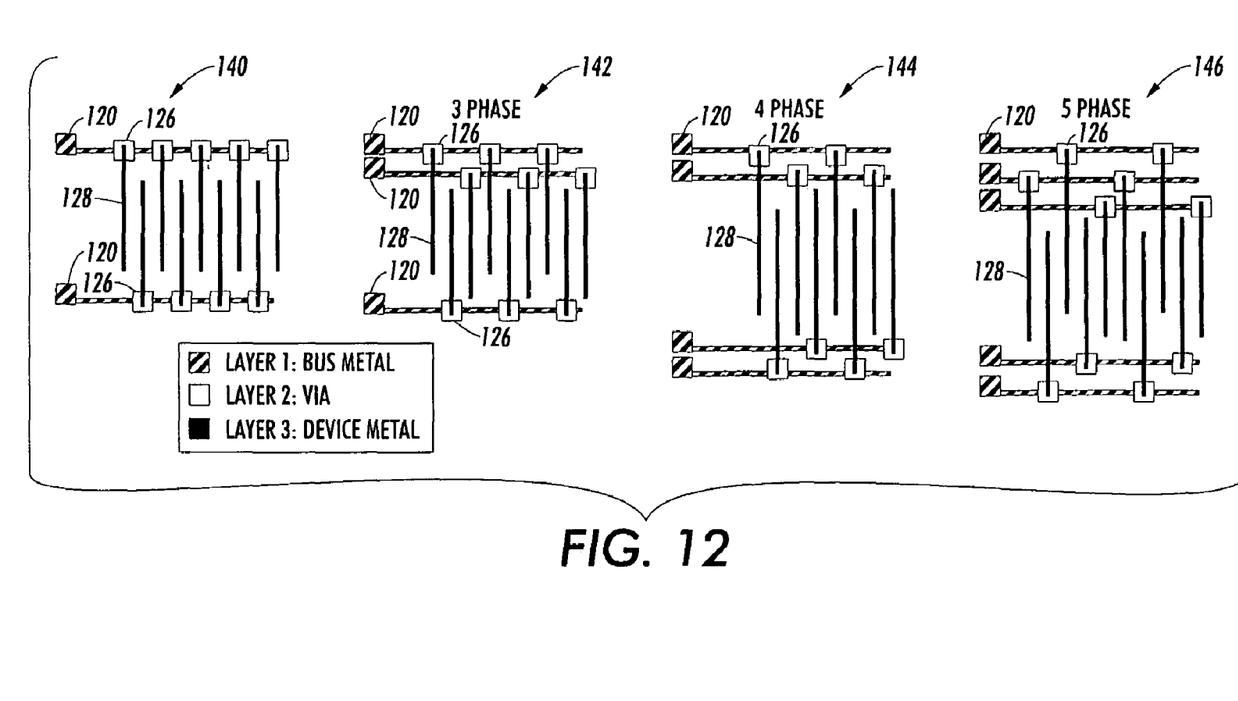
FIG. 12 shows exemplary device electrode configurations for embodiments of the present application.

A top view is provided in FIG. 12 of the device of FIG. 11 to further illustrate the exemplary device layouts. The figure is abstracted in order to more clearly show the bus metal 120, the via 126, and the bottom electrode metal layer 128. Exemplary layouts are shown for a 2 phase device 140, a 3 phase device 142, a 4 phase device 144, and a 5 phase device 146. It should be obvious from the examples provided that the aforementioned process and device layouts can be extended to devices of any number of phases. It should also be noted that the process described, and the device layouts provided are for purposes of explaining embodiments of the present disclosure only, and the disclosure is not limited to the layouts and process provided herein.

An advantage of the device structure provided in FIGS. 11 and 12 is that the number of mask layers does not depend on the number of phases. In other words, only three mask layers are required to produce 2, 3, 4, 5 . . . n-phase devices. However, concepts of the present disclosure are intended to include other n-phase embodiments which incorporate the concept of a travelling wave in the deformable layer as described herein. For example, the electrode configuration may be a multi-layer configuration.

It is also to be appreciated that the signal applied to the bottom electrodes can be different from sinusoidal signals depending on the response required. Sinusoidal signals were used in describing various embodiments, however, the present disclosure is not limited by the waveshape of the applied signals. For example, square wave and sawtooth signals, among others, are suitable for use with devices embodying concepts of the present disclosure.

Still further, the techniques described herein may also be used in other Micro-Electro-Mechanical-Systems (MEMS) grating-based optical modulators. For example, the foregoing concepts may be used in MEMS grating-based optical modulators which do not use a compliant layer as previously described, but rather the layer is one of air, used to separate top and bottom layers/electrodes. This technique may also be useful for elastomer and other MEMS-based surface relief patterns, e.g., Fresnel lens, electronic holograms, etc.

It is to be appreciated that features of the foregoing embodiments may be combined with features of other embodiments described herein, and although components may be numbered differently, they may include characteristics of similar components found in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A variable modulator assembly comprising:
   a deformable layer;
   an electrode configuration consisting of a plurality of electrodes, the electrode configuration configured for n-phase operation, wherein n>2; and
   a controller configured to selectively apply a variable signal to selected electrodes of the electrode configuration, wherein application of the variable signal causes the deformable layer to reconfigure to an altered shape having distinct peaks and valleys, the distance between the peaks and valleys being determined by the value of the applied variable signal, and wherein the altered shape moves in a preferred direction in the plane of the deformable layer.

2. The assembly according to claim 1 further comprising:
a compliant layer having a first surface and a second surface;
the deformable layer adhered to the first surface of the compliant layer;
the plurality of electrodes in contact with the second surface of the compliant layer.

3. The assembly according to claim 1, wherein the selective application of the variable signal generates a traveling wave.

4. The assembly according to claim 3, wherein traveling wave forms a pattern of the peaks and valleys moving in space.

5. The assembly according to claim 4, wherein the variable signal is an analog signal.

6. The assembly according to claim 1, wherein the peaks and valleys have substantially constant pitches and depths.

7. The assembly according to claim 1, wherein the controller provides for an analog control of light delivered to the deformable surface.

8. The assembly according to claim 1 further including a layer of air to separate a top electrode and a bottom electrode.

9. The assembly according to claim 2, wherein the compliant layer, deformable layer, electrode configuration and controller operate as one of a filter or scanner.

10. The assembly according to claim 1, wherein the n-phase of operation is n<13 is one of an even phase and an odd phase.

11. The assembly according to claim 1, wherein the greater the phases of the modulator assembly, the closer to an actual sinusoidal grating is obtained.

12. The assembly according to claim 1, wherein the smaller the phase of the modulator assembly, the larger a diffraction angle.

13. The assembly according to claim 1, wherein a voltage at each electrode at a position x is found by, $$V = V_{offset} + \frac{V_{pp}}{2}\sin(\omega t + \phi_n),$$

with $V_{pp}$=peak-to-peak voltage, $$V_{offset} = \frac{V_{pp}}{2}$$

and $\phi_n$ being the phase difference between adjacent electrodes.

14. The assembly according to claim 1, wherein distances between the peaks and valleys are greater when the modulator assembly is operated with even number phases as compared to the modulator assemblies operating with odd number phases.

15. The assembly according to claim 1, wherein the modulator assembly is configured such that when it is operated with an odd phase, it has a lower optical power jitter compared to the assembly operated with an even phase.

16. An optical modulating method comprising:
positioning a variable modulator assembly to receive light from a light source, wherein a deformable layer is adhered to a first surface of a compliant layer of the light source, and deformation of the deformable layer is controlled by selective activation of an electrode configuration adhered to a second surface of the compliant layer, the activation of the electrode configuration is controlled by a controller;
generating a variable signal from the controller; and
transmitting the variable signal to selected electrodes of the electrode configuration, wherein activation of the electrodes creates electrostatic charges which deform the deformable layer into a travelling pattern moving in a direction parallel to the plane of the deformable layer corresponding to the activated electrodes.

17. The method according to claim 16, wherein the variable signal is an analog signal.

18. The method according to claim 17, wherein the transmitting of the analog signal results in a traveling wave being supplied to the assembly.

19. The method according to claim 18, wherein the traveling pattern reduces the long-term drift of the surface pattern, as compared to a fixed dc bias signal.

20. The method according to claim 16, wherein phase grating, formed by the transmitted variable signal has corrugations with substantially constant pitch and depth.

21. A VOA device fabrication method comprising:
depositing a bus metal layer on a substrate;
patterning the bus metal layer;
depositing a dielectric layer on the bus metal layer and the substrate;
forming a via in the dielectric layer to the bus metal layer;
depositing a bottom electrode metal layer in contact with the bus metal layer, the bottom electrode layer being configured for n-phase operation, wherein n>2;
spin coating a compliant layer onto the bottom electrode layer and the dielectric layer; and
depositing a blanket top electrode/reflector metal layer onto the compliant layer.

22. The method according to claim 21, wherein the VOA device is formed using three mask layers.

* * * * *